UNITED STATES PATENT OFFICE.

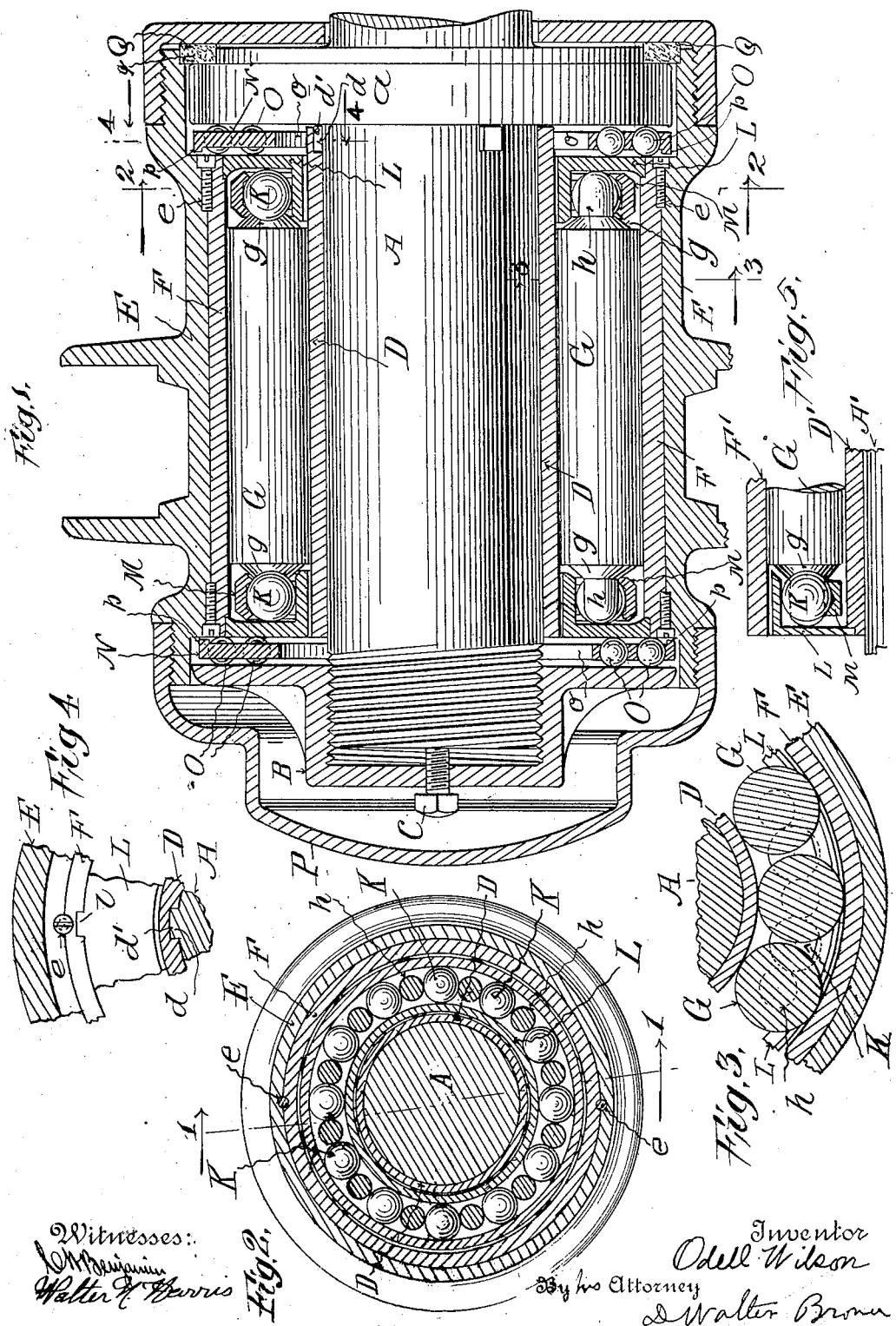

ODELL WILSON, OF LAKEWOOD, OHIO.

ANTIFRICTION ROLLER-BEARING.

1,111,550.  Specification of Letters Patent.  Patented Sept. 22, 1914.

Application filed March 20, 1912.  Serial No. 684,940.

*To all whom it may concern:*

Be it known that I, ODELL WILSON, a citizen of the United States, and a resident of Lakewood, in the county of Cuyahoga and State of Ohio, have invented certain new and useful Improvements in Antifriction Roller-Bearings, of which the following is a specification.

This invention relates to improvements in anti-friction roller bearings.

The invention is applicable to devices wherein there is relative rotary motion between the parts, as between a wheel or pulley and its axle or shaft, or between shafts and their bearings, and is applicable both to the case when the wheel, pulley or bearing rotates and the shaft or axle is stationary and to the case when the wheel, pulley or bearing is stationary and the axle or shaft rotates.

This invention is intended especially to provide anti-friction roller bearings wherein the rollers take both load and end thrust, the roller spacing balls being practically without strain either of load or end thrust, and serving only their proper purpose of spacing the rollers.

This invention also provides for taking up the end thrust as well as the load with the minimum of friction and of wear and the maximum of durability.

It also provides for the simple and convenient assembling of the parts, and their removal for cleaning, renewal, or repair.

The invention also prevents the objectionable tilting of the ends of the rollers by which the friction is increased, the smooth running prevented, and the rollers and bolts subjected to objectionable and unnecessary strains.

Other advantages of the invention will be apparent from the description and claims hereinafter following.

Referring to the drawings which accompany the specification, to aid the description, Figure 1 is a longitudinal section on the plane of the line 1—1 of Fig. 2, with certain parts in elevation, of that form of the invention wherein a wheel rotates on a stationary axle; Fig. 2 is a transverse section, on smaller scale, and with certain parts in elevation, on the plane of the line 2—2 of Fig. 1; Fig. 3 is a broken sectional detail, on the plane of the line 3—3 of Fig. 1, and showing certain rollers and part of the axle and its sleeve, and of the hub of the wheel and its sleeve. Certain roller spacing balls are also indicated; Fig. 4 is a detail, partly sectioned and partly in elevation, on the plane of the line 4—4 of Fig. 1, and indicating part of the hub, hub sleeve retainer, axle and axle sleeve; Fig. 5 is a detail of parts of a modification wherein the axle revolves in a stationary box or bearing.

Referring to Figs. 1 to 4 inclusive, A is a stationary axle having the fixed collar $a$, and provided with the flanged nut B threaded on the end of said axle A, $c$ being the usual locking screw. On said axle A is preferably fixed a sleeve D by any suitable construction, as lugs and grooves $d$, $d'$ (Fig. 4). Said sleeve will be preferably of hard steel, or other hard durable wearing material. The hub E of the wheel, which revolves on said axle A, other parts of the wheel not being shown on the drawings, is preferably provided with a hard metal sleeve F, fixed in said hub E in any suitable manner, as by screws $e$ engaging threaded half-round holes respectively in said hub and said sleeve. Said sleeve F is of proper diameter with relation to said axle sleeve D, to provide for properly placing the anti-friction rollers G, the spacing balls and other parts within said sleeve F, said sleeve F (or the hub E, and axle A if no sleeves are used) constituting a housing for said rollers, balls and their races and other parts. Between said sleeves D and F, are the said anti-friction rollers G, of hard wearing material, properly spaced around said sleeve D by the aid of balls K of smaller diameter than said rollers, as hereinafter more fully described. Said rollers G, are intended to take up the entire load, as well as the end thrusts that may come upon them. For this purpose said rollers G, being all preferably of similar dimensions and form, are each provided with beveled ends $g$ joining cylindrical concentric extensions or trunnions $h$, the ends of said trunnions $h$ taking up preliminarily any end thrust, and being preferably rounded on their extremities, as indicated, to diminish friction, and extending slightly beyond the outer periphery of said balls K, and being normally in loose contact with the retainers. Said rollers G are properly spaced and kept from coming into contact with each other, by the roller spacing balls K, so located in their retainers L as to contact squarely between said cylindrical axes $h$. Said balls are loosely disposed in their said retainers L so that they serve only for spacing said rollers G, and are not required to sustain either the load or the end thrust. Said retainers L, located adjacent to each end of said rollers G, are flanged rings, the rings therefor forming two sides of the ball races, and the said balls K being properly retained in said retainers by the race rings M, hereinafter more particularly described. Said retainers L are secured to said hub sleeve F in any suitable manner, as by slots and grooves *l*, (Fig. 4), and turn with said hub E. Located loosely in said retainers L so as to contact with said balls K at points on the outer sides of said balls and at opposite sides of the ball centers, and to have practically no friction with the ends of said rollers or said retainers, are said race rings M, which are so hollowed in cross section as to have the proper contact with said balls K. Said retainers L are of such dimensions and so shaped as to permit of proper clearance between the beveled parts of said rollers and the edges of said retainers, and to prevent any jamming of the race rings or the spacing balls, end thrust being taken up by the rounded ends of said roller trunnions *h*, as hereinbefore stated, and through them imparted to the retainers L. Said balls K are so positioned by the construction herein before described that the center of said balls K are in the locus of the axes of the roller trunnions, whereby the spacing balls will be squarely between the trunnions; and this is a useful feature of the invention, since it obviates the tendency of the said rollers G to tilt at one end, and tends to keep the said rollers in accurate alinement under all conditions of load and end thrust strain.

The end thrust of the hub E and of the rollers G is taken up by the balls of the thrust collars N, there being a similar collar adjacent to each said race L. One of said collars N is positioned between the axle collar *a* and one of said retainers L, and the other of said collars N is disposed between the other retainer L and the flange of said nut B, (Fig. 1). Each of said end thrust collars N is provided with apertures or pockets in which are loosely held balls O, which take the thrust of the said retainers L and nut B with a minimum of friction; said collars N revolving freely around said axle, the central apertures of said collars being larger than said axle A. Said collars N are preferably formed with peripheral rims or flanges *p*, which facilitate properly assembling and retaining the thrust collars and their parts in position. The outer end of said hub E is provided with a dust guard cap P, and the inner end of said hub is provided with a cap, or dust guard plate Q, fitted loosely around said axle A. An annular washer *q* of felt or other suitable material makes a dust-proof joint with the inside of said cap Q.

In assembling the parts, it will be evident that the retainers L, the race rings M, the rollers G, the balls K can be readily placed in their proper relative positions in the hub sleeve F, before said sleeve F is inserted in the hub, said sleeve F constituting a convenient cage or housing for assembling the aforesaid various parts. Then the said hub sleeve and assembled parts are readily inserted and fastened in hub E. Next one of the thrust collars N with its balls, is slipped home to place over the axle A. Next said hub E with the assembled parts is slipped to place on said axle A, the other thrust collar N, with its balls, is put on, and said nut B is screwed home on said axle A, being locked by screw C. Finally the dust cap P is put on the hub E.

From the foregoing description it will be evident that all the load is received by the rollers G; that all end thrust is also taken up by said rollers G, the races L, thrust collars N, the axle shoulder *a* and the nut B; and that said balls K are practically entirely relieved of any load or end thrust strain, while said balls K are properly positioned between and space said rollers G by the race rings M coöperating with the retainers L; the concaved shape of the inner side of said rings M, preventing said rings from traveling sidewise. Thus, as the hub revolves in contact with said rollers G, said rollers roll smoothly and truly, without tilting, around the axle A; the balls K, the retainers L, the race segments M, and the thrust collars N also revolve freely, smoothly and with the minimum friction; and thus finally, the revolution of the hub takes place with the minimum of friction.

Fig. 5 illustrates parts of the invention arranged for the case when an axle or shaft A revolves in a stationary box or bearing. The box or bearing, not itself illustrated, will be of any suitable construction, and provided with an internal stationary hard metal sleeve F′ of proper size and shape to permit rollers G to be arranged within said sleeve F′ around said axle A′. Said axle A′ will preferably be provided with a hard metal sleeve D′ secured to said axle A′. Anti-friction rollers G contacting with said sleeves F′ and D′ will be arranged in said box around said sleeve D′, said rollers G being similar in construction and operation to the aforesaid rollers G described in connection with Figs. 1 to 4 of the said accompanying drawings, and being adapted to take the entire load and preliminarily its own end thrust. Balls K, retainers L, race rings M, will also be provided which are in general similar in construction and arrangement to corresponding parts hereinbefore described in connection with said Figs. 1 to 4, but said retainers L are reversed so that their flanges are in contact with the outer sides of said balls K, and said race segments M are now positioned at the inner sides of said balls K as shown in Fig. 5. But said retainers L will now be secured to and revolve with said axle or axle sleeve D′ and will not be connected with said sleeve F′, so that said retainers L and race rings M may revolve in the bearing as said axle A′ turns. End thrust collars with antifriction balls, not shown in said Fig. 5, but similar to the aforesaid end thrust collars N and balls O, will also be provided, and suitable nuts, dust guards and other parts will also be furnished as is well understood in the art. In the construction illustrated in Fig. 5, the said sleeve D′ forms a cage in which are readily assembled the rollers, ball race and race rings, the whole then being placed in position on the axle.

In the modification illustrated in part in said Fig. 5, therefore, as well as in that illustrated in Figs. 1 to 4 inclusive, all the load will be sustained by the rollers G, and their end thrust will be taken up by the retainers L through trunnions h, and the balls K will serve only for properly spacing said rollers G, and the said axle will turn smoothly in its box or bearing with the minimum of friction and maximum of durability.

Now having described my improvements, I claim as my invention.

1. A journal member and a bearing member with intervening rollers having axial trunnions on their ends, series of spacing balls between the trunnions, flanged rings on one member forming retainers for one side of each series of balls, floating race rings on the other side of each series of balls, and means on one member free of the balls for stopping endwise movement of the rollers.

2. A journal member and a bearing member with intervening rollers having axial trunnions on their ends, series of spacing balls between the trunnions, flanged rings on one member forming stops for the trunnions independent of the balls and also forming retainers for one side of each series of balls, and floating race rings on the other side of each series of balls.

3. A journal member and a bearing member with intervening rollers having axial trunnions on their ends, series of spacing balls between the trunnions, flanged rings on one member forming retainers for one side of each series of balls, floating race rings on the other side of each series of balls, and means free of the spacing balls and race rings for stopping endwise movement of the one member with reference to the other member.

4. A journal member and a bearing member with intervening rollers having axial trunnions on their ends, series of spacing balls between the trunnions, flanged rings on one member forming retainers for one side of each series of balls, floating race rings on the other side of each series of balls, means free of the spacing balls and race rings for stopping endwise movement of the one member with reference to the other member, and means on one member free of the balls for stopping endwise movement of the balls.

Signed at the city of Cleveland, in the county of Cuyahoga, and State of Ohio, this 18th day of March, A. D. 1912.

ODELL WILSON.

Witnesses:
FRANK G. BAUMGARDNER,
M. L. CROTTY.